(12) United States Patent
Wang et al.

(10) Patent No.: US 11,870,727 B2
(45) Date of Patent: Jan. 9, 2024

(54) METHOD FOR TRANSMITTING UPLINK SIGNAL AND COMMUNICATIONS APPARATUS

(71) Applicant: HUAWEI TECHNOLOGIES CO., LTD., Shenzhen (CN)

(72) Inventors: Lei Wang, Shanghai (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/988,499

(22) Filed: Aug. 7, 2020

(65) Prior Publication Data

US 2020/0374058 A1    Nov. 26, 2020

Related U.S. Application Data

(63) Continuation of application No. PCT/CN2019/073789, filed on Jan. 29, 2019.

(30) Foreign Application Priority Data

Feb. 12, 2018  (CN) .......................... 201810148319.7

(51) Int. Cl.
*H04L 5/00* (2006.01)
*H04W 72/1268* (2023.01)
(Continued)

(52) U.S. Cl.
CPC .......... *H04L 5/0053* (2013.01); *H04L 5/0016* (2013.01); *H04L 5/0044* (2013.01);
(Continued)

(58) Field of Classification Search
CPC ... H04L 5/0007; H04L 5/0016; H04L 5/0044; H04L 5/0053; H04L 5/0055; H04L 5/0057
See application file for complete search history.

(56) References Cited

U.S. PATENT DOCUMENTS 5,619,492 A * 4/1997 Press .................. H04J 13/16
                                                      370/441
10,667,243 B2 * 5/2020 Lee .................. H04L 27/26035
(Continued)

FOREIGN PATENT DOCUMENTS

| CN | 104426633 A | 3/2015 |
|---|---|---|
| CN | 105262559 A | 1/2016 |

(Continued)

*Primary Examiner* — Omer S Mian
(74) *Attorney, Agent, or Firm* — Stein IP, LLC

(57) ABSTRACT

A method and communications apparatus to help improve time-frequency resource utilization. The method includes generating, based on a first non-orthogonal access parameter, a signal that carries uplink data, where the signal that carries the uplink data occupies a first time-frequency resource, generating, based on a second non-orthogonal access parameter, a signal that carries uplink control information, where the signal that carries the uplink control information occupies a second time-frequency resource, the first time-frequency resource overlaps the second time-frequency resource, and the first non-orthogonal access parameter is different from the second non-orthogonal access parameter, and sending the signal that carries the uplink data and the signal that carries the uplink control information.

26 Claims, 7 Drawing Sheets

(51) Int. Cl.
*H04W 72/21* (2023.01)
*H04W 72/02* (2009.01)

(52) U.S. Cl.
CPC .......... *H04L 5/0055* (2013.01); *H04L 5/0057* (2013.01); *H04W 72/02* (2013.01); *H04W 72/1268* (2013.01)

(56) References Cited

U.S. PATENT DOCUMENTS

| | | | | |
|---|---|---|---|---|
| 2006/0209703 | A1* | 9/2006 | Baker | H04W 52/0245 370/252 |
| 2010/0272019 | A1* | 10/2010 | Papasakellariou | H04W 72/121 370/328 |
| 2011/0013615 | A1* | 1/2011 | Lee | H04W 52/58 370/344 |
| 2012/0113905 | A1* | 5/2012 | Anderson | H04W 76/38 370/329 |
| 2015/0365831 | A1* | 12/2015 | Ko | H04L 5/001 370/329 |
| 2016/0381674 | A1* | 12/2016 | Kim | H04L 1/189 370/329 |
| 2018/0338306 | A1* | 11/2018 | Wu | H04L 5/0053 |
| 2019/0261358 | A1* | 8/2019 | Tang | H04W 72/044 |
| 2020/0008158 | A1* | 1/2020 | Yamamoto | H04W 52/325 |
| 2021/0160901 | A1* | 5/2021 | Takeda | H04W 72/1284 |

FOREIGN PATENT DOCUMENTS

| | | |
|---|---|---|
| EP | 2479910 A2 | 7/2012 |
| EP | 3062554 A1 | 8/2016 |
| KR | 20170102824 A | 9/2017 |
| WO | 2017038533 A1 | 3/2017 |
| WO | 2017171516 A1 | 10/2017 |

* cited by examiner

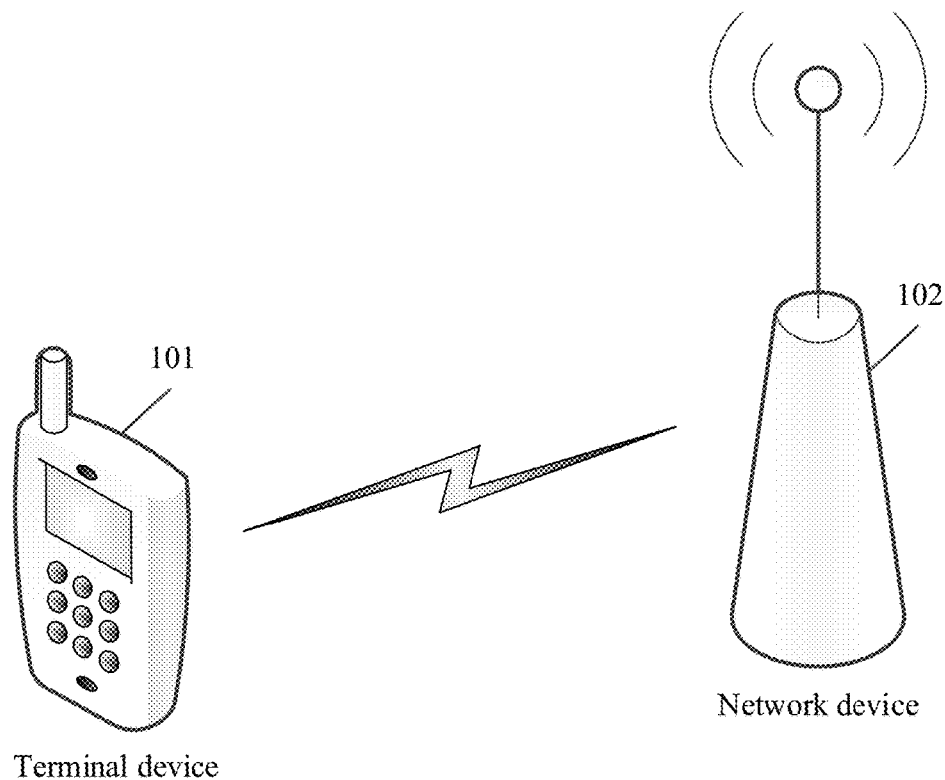

A terminal device generates, based on a first non-orthogonal access parameter, a signal that carries uplink data, where the signal that carries the uplink data occupies a first time-frequency resource

S202

The terminal device generates, based on a second non-orthogonal access parameter, a signal that carries uplink control information, where the signal that carries the uplink control information occupies a second time-frequency resource

S203

The terminal device sends the signal that carries the uplink data and the signal that carries the uplink control information

FIG. 2

A network device sends first configuration information and second configuration information to a terminal device, where the first configuration information includes information about a first non-orthogonal access parameter used to transmit uplink data and information about a first time-frequency resource used to transmit the uplink data, and the second configuration information includes information about a second non-orthogonal access parameter used to transmit uplink control information on a second time-frequency resource, where the first non-orthogonal access parameter is different from the second orthogonal access parameter, and the first time-frequency resource overlaps the second time-frequency resource

S401

The network device receives an uplink signal sent by the terminal device, where uplink signals include a signal that is generated based on the first non-orthogonal access parameter and that carries the uplink data and a signal that is generated based on the first non-orthogonal access parameter and that carries the uplink control information, the signal that carries the uplink data occupies the first time-frequency resource, and the signal that carries the uplink control information occupies the second time-frequency resource

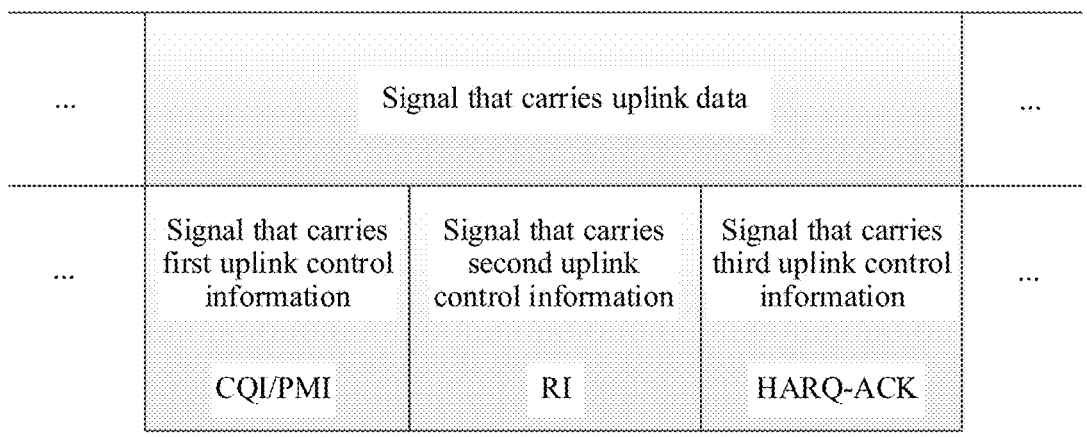

FIG. 5

METHOD FOR TRANSMITTING UPLINK SIGNAL AND COMMUNICATIONS APPARATUS

CROSS-REFERENCE TO RELATED APPLICATIONS

This application is a continuation of International Application No. PCT/CN2019/073789, filed on Jan. 29, 2019, which claims priority to Chinese Patent Application No. 201810148319.7, filed on Feb. 12, 2018. The disclosures of the aforementioned applications are hereby incorporated by reference in their entireties.

TECHNICAL FIELD

Aspects of this application relate to the communications field, and in particular, to a method for transmitting an uplink signal and a communications apparatus.

BACKGROUND

In long term evolution (LTE) technology, a resource occupied by uplink control information in uplink transmission and a resource occupied by uplink data in uplink transmission are orthogonally multiplexed. Because a plurality of users may perform uplink transmission on a same resource, a large quantity of time-frequency resources need to be occupied to transmit the uplink control information, and time-frequency resources that can be used to transmit the uplink data are relatively reduced. Consequently, utilization of the time-frequency resources is low.

SUMMARY

Aspects of this application provides a method for transmitting an uplink signal and a communications apparatus, to help improve channel resource utilization.

According to a first aspect, this application provides a method for transmitting an uplink signal, including:
  generating, based on a first non-orthogonal access parameter, a signal that carries uplink data, where the signal that carries the uplink data occupies a first time-frequency resource;
  generating, based on a second non-orthogonal access parameter, a signal that carries uplink control information, where the signal that carries the uplink control information occupies a second time-frequency resource, and the first time-frequency resource overlaps the second time-frequency resource; and the first non-orthogonal access parameter is different from the second non-orthogonal access parameter; and
  sending the signal that carries the uplink data and the signal that carries the uplink control information. Compared with the prior art, the signal that carries the uplink data and the signal that carries the uplink control information are sent in a non-orthogonal multiplexing manner, thereby helping improve time-frequency resource utilization.

In a possible design, the first non-orthogonal access parameter and the second non-orthogonal access parameter include different non-orthogonal access spreading factors; and/or
  the first non-orthogonal access parameter and the second non-orthogonal access parameter include different bit-group-to-symbol-group mapping nil es; and/or
  the first non-orthogonal access parameter and the second non-orthogonal access parameter include different interleaving parameters; and/or
  the first non-orthogonal access parameter and the second non-orthogonal access parameter include different scrambling parameters; and/or
  the first non-orthogonal access parameter and the second non-orthogonal access parameter include different transmit powers.

In a possible design, the method further includes: determining the second non-orthogonal access parameter based on a type of the uplink control information.

In a possible design, the method further includes:
  determining the second time-frequency resource based on the type of the uplink control information.

In a possible design, the uplink control information includes first uplink control information and second uplink control information; and correspondingly, the determining the second non-orthogonal access parameter based on a type of the uplink control information includes:
  determining, based on a type of the first uplink control information, a second non-orthogonal access parameter corresponding to the first uplink control information; and
  determining, based on a type of the second uplink control information, a second non-orthogonal access parameter corresponding to the second uplink control information.

In a possible design, the determining the second time-frequency resource based on the type of the uplink control information includes:
  determining, based on the type of the first uplink control information, a second time-frequency resource occupied by a signal that carries the first uplink control information; and
  determining, based on the type of the second uplink control information, a second time-frequency resource occupied by a signal that carries the second uplink control information.

In a possible design, in the process of generating the signal that carries the uplink control information, the first uplink control information and the second uplink control information are encoded as a whole.

In a possible design, in the process of generating the signal that carries the uplink control information, the first uplink control information and the second uplink control information are separately encoded.

In a possible design, the method further includes: obtaining, based on the type of the uplink control information, configuration information used to determine the second non-orthogonal access parameter.

According to a second aspect, this application provides another method for transmitting an uplink signal, including:
  sending first configuration information and second configuration information to a terminal device, where the first configuration information includes information about a first non-orthogonal access parameter used to transmit uplink data and information about a first time-frequency resource used to transmit the uplink data, and the second configuration information includes information about a second non-orthogonal access parameter used to transmit uplink control information on a second time-frequency resource, where the first non-orthogonal access parameter is different from the second orthogonal access parameter, and the first time-frequency resource overlaps the second time-frequency resource; and receiving an uplink signal sent by the terminal device, where uplink signals include a signal that is generated based on the first non-orthogonal access parameter and that carries the uplink data and a signal that is generated based on the first non-orthogonal access parameter and that carries the uplink control information, the signal that carries the uplink data occupies the first time-frequency resource, and the signal that carries the uplink control information occupies the second time-frequency resource.

In a possible design, the first non-orthogonal access parameter and the second non-orthogonal access parameter include different non-orthogonal access spreading factors; and/or the first non-orthogonal access parameter and the second non-orthogonal access parameter include different bit-group-to-symbol-group mapping ml es; and/or the first non-orthogonal access parameter and the second non-orthogonal access parameter include different interleaving parameters; and/or the first non-orthogonal access parameter and the second non-orthogonal access parameter include different scrambling parameters; and/or the first non-orthogonal access parameter and the second non-orthogonal access parameter include different transmit powers.

In a possible design, the second configuration information further includes information about the second time-frequency resource.

In a possible design, the second time-frequency resource is determined based on a type of the uplink control information.

In a possible design, the second non-orthogonal access parameter is determined based on the type of the uplink control information.

In a possible design, the uplink control information includes first uplink control information and second uplink control information; and the information about the second non-orthogonal access parameter used to transmit the uplink control information includes information about a second non-orthogonal access parameter used to transmit the first uplink control information and information about a second non-orthogonal access parameter used to transmit the second uplink control information.

In a possible design, second time-frequency resources include a second time-frequency resource used to transmit the first uplink control information and a second time-frequency resource used to transmit the second uplink control information.

According to a third aspect, an embodiment of this application provides a communications apparatus, including:

a generation unit, configured to generate, based on a first non-orthogonal access parameter, a signal that carries uplink data, where the signal that carries the uplink data occupies a first time-frequency resource; and the generation unit is configured to generate, based on a second non-orthogonal access parameter, a signal that carries uplink control information, where the signal that carries the uplink control information occupies a second time-frequency resource, and the first time-frequency resource overlaps the second time-frequency resource; and the first non-orthogonal access parameter is different from the second non-orthogonal access parameter; and a sending unit, configured to send the signal that carries the uplink data and the signal that carries the uplink control information.

In a possible design, the first non-orthogonal access parameter and the second non-orthogonal access parameter include different non-orthogonal access spreading factors; and/or the first non-orthogonal access parameter and the second non-orthogonal access parameter include different bit-group-to-symbol-group mapping nil es; and/or the first non-orthogonal access parameter and the second non-orthogonal access parameter include different interleaving parameters; and/or the first non-orthogonal access parameter and the second non-orthogonal access parameter include different scrambling parameters; and/or the first non-orthogonal access parameter and the second non-orthogonal access parameter include different transmit powers.

In a possible design, the communications apparatus further includes:

a first determining unit, configured to determine the second non-orthogonal access parameter based on a type of the uplink control information.

In a possible design, the communications apparatus further includes:

a second determining unit, configured to determine the second time-frequency resource based on the type of the uplink control information.

In a possible design, the uplink control information includes first uplink control information and second uplink control information; and correspondingly, the first determining unit is configured to:

determine, based on a type of the first uplink control information, a second non-orthogonal access parameter corresponding to the first uplink control information; and determine, based on a type of the second uplink control information, a second non-orthogonal access parameter corresponding to the second uplink control information.

In a possible design, the second determining unit is configured to:

determine, based on the type of the first uplink control information, a second time-frequency resource occupied by a signal that carries the first uplink control information; and determine, based on the type of the second uplink control information, a second time-frequency resource occupied by a signal that carries the second uplink control information.

In a possible design, in the process in which the generation unit generates the signal that carries the uplink control information, the first uplink control information and the second uplink control information are encoded as a whole.

In a possible design, in the process in which the generation unit generates the signal that carries the uplink control information, the first uplink control information and the second uplink control information are separately encoded.

In a possible design, the communications apparatus further includes:

an obtaining unit, configured to obtain, based on the type of the uplink control information, configuration information used to determine the second non-orthogonal access parameter.

According to a fourth aspect, this application provides another communications apparatus, including:
- a first sending unit, configured to send first configuration information and second configuration information to a terminal device, where the first configuration information includes information about a first non-orthogonal access parameter used to transmit uplink data and information about a first time-frequency resource used to transmit the uplink data, and the second configuration information includes information about a second non-orthogonal access parameter used to transmit uplink control information on a second time-frequency resource, where the first non-orthogonal access parameter is different from the second orthogonal access parameter, and the first time-frequency resource overlaps the second time-frequency resource; and
- a receiving unit, configured to receive an uplink signal sent by the terminal device, where uplink signals include a signal that is generated based on the first non-orthogonal access parameter and that carries the uplink data and a signal that is generated based on the first non-orthogonal access parameter and that carries the uplink control information, the signal that carries the uplink data occupies the first time-frequency resource, and the signal that carries the uplink control information occupies the second time-frequency resource.

In a possible design, the first non-orthogonal access parameter and the second non-orthogonal access parameter include different non-orthogonal access spreading factors; and/or
- the first non-orthogonal access parameter and the second non-orthogonal access parameter include different bit-group-to-symbol-group mapping nil es; and/or
- the first non-orthogonal access parameter and the second non-orthogonal access parameter include different interleaving parameters; and/or
- the first non-orthogonal access parameter and the second non-orthogonal access parameter include different scrambling parameters; and/or
- the first non-orthogonal access parameter and the second non-orthogonal access parameter include different transmit powers.

In a possible design, the second configuration information further includes information about the second time-frequency resource.

In a possible design, the second time-frequency resource is determined based on a type of the uplink control information.

In a possible design, the second non-orthogonal access parameter is determined based on the type of the uplink control information.

In a possible design, the uplink control information includes first uplink control information and second uplink control information; and the information about the second non-orthogonal access parameter used to transmit the uplink control information includes information about a second non-orthogonal access parameter used to transmit the first uplink control information and information about a second non-orthogonal access parameter used to transmit the second uplink control information.

In a possible design, second time-frequency resources include a second time-frequency resource used to transmit the first uplink control information and a second time-frequency resource used to transmit the second uplink control information.

According to a fifth aspect, this application provides another communications apparatus, including:
- a transmitter configured to send a signal; and
- a processor that invokes executable program code to perform all or a part of the method according to the first aspect.

According to a sixth aspect, an embodiment of this application provides a computer-readable storage medium, and the computer-readable storage medium includes a program instruction. When the program instruction is run on a computer, the computer is enabled to perform all or a part of the method according to the first aspect.

According to a seventh aspect, an embodiment of this application provides another communications apparatus, including:
- a transmitter configured to send a signal; and
- a processor that invokes executable program code to perform all or a part of the method according to the second aspect.

According to an eighth aspect, an embodiment of this application provides another computer-readable storage medium, and the computer-readable storage medium includes a program instruction. When the program instruction is run on a computer, the computer is enabled to perform all or a part of the method according to the second aspect.

It can be learned that in the solution in the embodiments of this application, a network device sends the first configuration information and the second configuration information to the terminal device, where the first configuration information includes the information about the first non-orthogonal access parameter used to transmit the uplink data and the information about the first time-frequency resource used to transmit the uplink data, and the second configuration information includes the information about the second non-orthogonal access parameter used to transmit the uplink control information on the second time-frequency resource. The first non-orthogonal access parameter is different from the second non-orthogonal access parameter, and the first time-frequency resource overlaps the second time-frequency resource. The terminal device generates the signal that carries the uplink data based on the first non-orthogonal access parameter and generates the signal that carries the uplink control information based on the second non-orthogonal access parameter, and sends, to the network device on the first time-frequency resource, the signal that carries the uplink data and sends, to the network device on the second time-frequency resource, the signal that carries the uplink control information. Compared with the prior art, the terminal device sends, to the network device in a non-orthogonal multiplexing manner, the signal that carries the uplink control information and the signal that carries the uplink data. This helps improve time-frequency resource utilization.

These aspects or other aspects of this application are clearer and comprehensible in descriptions of the following embodiments.

BRIEF DESCRIPTION OF DRAWINGS

To describe the technical solutions in the embodiments of this application or in the prior art more clearly, the following briefly describes the accompanying drawings required for describing the embodiments or the prior art. the accompanying drawings in the following descriptions show some embodiments of this application, and a person of ordinary skill in the art may still derive other drawings from these accompanying drawings without creative efforts.

FIG. 1 is a schematic diagram of an application scenario according to an embodiment of this application;

FIG. 2 is a schematic flowchart of a method for transmitting an uplink signal according to an embodiment of this application;

FIG. 4 is a schematic flowchart of another method for transmitting an uplink signal according to an embodiment of this application;

FIG. 5 is a schematic diagram of transmitting an uplink signal according to an embodiment of this application;

DESCRIPTION OF EMBODIMENTS

Figure 3:
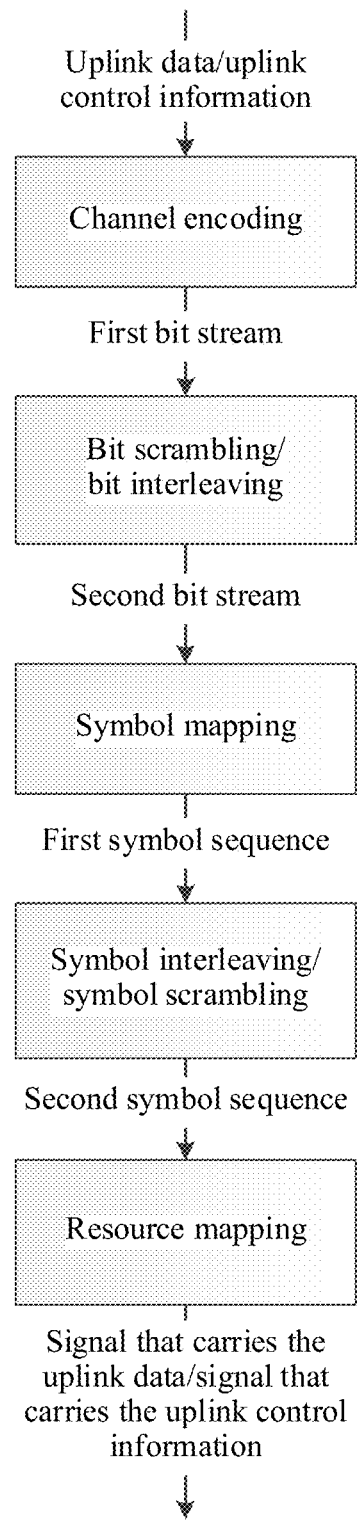
FIG. 3 is a schematic flowchart of processing uplink data/uplink control information according to an embodiment of this application.

The following describes the embodiments of this application with reference to the accompanying drawings. The term "and/or" describes an association relationship between associated objects and indicates that three relationships may exist: "A", "B" or both "A" and "B". "At least one of "A" or "B" means "A", "B" or both "A" and "B". "One or more" means "A", "B" or both "A" and "B".

FIG. 1 is a schematic diagram of an application scenario according to an embodiment of the present invention. As shown in FIG. 1, the schematic diagram of the application scenario includes a terminal device 101 and a network device 102.

The network device 102 communicates with the terminal device 101 in a wireless manner. For ease of representation, the communication is represented by using only a lightning-shaped line in FIG. 1. The application scenario shown in FIG. 1 may be specifically applied to a fifth generation (5G) communications system or a subsequently evolved communications system, or may be applied to interaction between the 5G communications system and another communications system of a different standard.

The network device 102 may be a macro network device, a micro network device, a pico network device, a distributed network device, or a network device of another type. The network device 102 may be specifically, for example, a wireless-fidelity (Wi-Fi) access point, a next-generation communications base station such as a 5G gNB, a 5G small cell, or a 5G micro cell, a transmission reception point (TRP), or a base station, a relay station, an access point, a vehicle-mounted device, or the like in 2G, 3G, or 4G.

The terminal device 101 may be user equipment (UE), to be specific, a device that provides a user with voice and/or data connectivity; or may be a handheld device or a vehicle-mounted device that has a wireless connection function. Common terminal devices include a mobile phone, a tablet computer, a notebook computer, a palmtop computer, a mobile internet device (MID), and an internet of things device (IoT), a wearable device (such as a smartwatch, a smart band, or a pedometer), and the like.

The network device 102 sends first configuration information and second configuration information to the terminal device 101. The first configuration information includes information about a first non-orthogonal access parameter used to transmit uplink data and information about a first time-frequency resource used to transmit the uplink data, and the second configuration information includes information about a second non-orthogonal access parameter used to transmit uplink control information on a second time-frequency resource. The terminal device 101 respectively generates, based on the first non-orthogonal access parameter and the second non-orthogonal access parameter, a signal that carries the uplink data and a signal that carries the uplink control information, where the signal that carries the uplink data occupies the first time-frequency resource, the signal that carries the uplink control information occupies the second time-frequency resource, and the first time-frequency resource overlaps the second time-frequency resource; and the terminal device 101 sends, on the first time-frequency resource, the signal that carries the uplink data to the network device 102, and sends, on the second time-frequency resource, the signal that carries the uplink control information to the network device 102, and the network device 102 receives the signal that carries the uplink data and the signal that carries the uplink control information.

FIG. 2 is a schematic flowchart of a method for transmitting an uplink signal according to an embodiment of this application. As shown in FIG. 2, the method includes the following steps.

S201: A terminal device generates, based on a first non-orthogonal access parameter, a signal that carries uplink data, where the signal that carries the uplink data occupies a first time-frequency resource.

The first non-orthogonal access parameter includes one or more of an encoding parameter, a spreading factor, a bit-group-to-symbol-group mapping rule, a scrambling parameter, an interleaving parameter, or a transmit power.

S202: The terminal device generates, based on a second non-orthogonal access parameter, a signal that carries uplink control information, where the signal that carries the uplink control information occupies a second time-frequency resource.

The first time-frequency resource overlaps the second time-frequency resource. Specifically, the first time-frequency resource partially overlaps the second time-frequency resource, or the first time-frequency resource is completely the same as the second time-frequency resource, or the first time-frequency resource includes the second time-frequency resource.

In an embodiment, the first time-frequency resource does not overlap the second time-frequency resource.

The second non-orthogonal access parameter includes an encoding parameter, a spreading factor, a bit-group-to-symbol-group mapping rule, a scrambling parameter, an interleaving parameter, and a transmit power.

Specifically, FIG. 3 is a schematic flowchart of processing uplink data/uplink control information according to an embodiment of this application. As shown in FIG. 3, for the uplink data, the foregoing terminal device separately performs channel encoding on the uplink data based on a channel encoding scheme indicated by the encoding parameter in the foregoing first non-orthogonal access parameter, to obtain a first bit stream. The first bit stream is binary data, and the channel encoding scheme may be a Turbo code, a low density parity check (LDPC) code, a polar code, or the like. The terminal device generates a binary scrambling sequence based on the scrambling parameter in the first non-orthogonal access parameter, and then performs a bit scrambling operation and a bit interleaving operation on the first bit stream respectively based on the binary scrambling sequence and an interleaving manner indicated by the interleaving parameter in the first non-orthogonal access parameter, to obtain a second bit stream. In addition, a sequence of the bit scrambling operation and the bit interleaving operation is not limited, and the bit scrambling operation may be performed before the bit interleaving operation, or the bit interleaving operation may be performed before the bit scrambling operation. The bit scrambling operation is performing, based on the scrambling sequence, an exclusive OR operation on the first bit stream, and the bit interleaving operation is changing an arrangement sequence of bits in the first bit stream. The terminal device performs symbol mapping on the second bit stream according to the bit-group-to-symbol-group mapping rule in the first non-orthogonal access parameter, groups the second bit stream, and maps each group of bits to M symbols, to obtain a first symbol sequence. M is the spreading factor in the first non-orthogonal access parameter.

For example, for a to-be-sent bit stream B obtained by performing at least one of channel encoding, bit interleaving, or bit scrambling, the terminal device divides the bit stream B into a plurality of groups, and then maps each group of bits to N symbols, where N is referred to as a spreading factor. A value of each of the N symbols is a complex number. Each group of bits has m bits, and the m bits have 2*m values. There are two bit-group-to-symbol-group mapping manners.

The m bits in each group of bits are mapped to one complex symbol by using a table of a correspondence between the 2*m values and the complex symbol, and then the complex symbol is multiplied by one spreading code with a length of N, to obtain N symbols. This mapping manner can be seen in, for example, a multi-user shared access (MUSA) technology.

The m bits in each group of bits are mapped to N complex symbols by using a table of correspondences between the 2*m values and the N complex symbols. A relationship between the m bits in each group of bits and the N complex symbols may be a non-linear relationship, and the N complex symbols may include a plurality of zeros. This mapping manner can be seen in, for example, a sparse coded multiple access (SCMA) technology.

The terminal device generates a complex scrambling sequence based on the scrambling parameter in the first non-orthogonal access parameter, and then separately performs a symbol scrambling operation on the first symbol sequence based on the complex scrambling sequence and the interleaving manner indicated by the interleaving parameter in the first non-orthogonal access parameter, to obtain a second symbol sequence. The symbol scrambling operation is multiplying the complex scrambling sequence by the first symbol sequence. The terminal device maps, based on the transmit power in the first non-orthogonal access parameter, the second symbol sequence to a first time-frequency resource, to obtain a signal that carries the uplink data, and sends the signal that carries the uplink data to a network device.

Optionally, before or after the symbol scrambling operation is performed, the terminal device performs a symbol interleaving operation on the first symbol sequence, where the symbol interleaving operation is changing an arrangement sequence of the first symbol sequence. According to the process shown in FIG. 3, the terminal device converts the foregoing uplink control information into a second symbol sequence based on a channel encoding scheme indicated by the encoding parameter, a scrambling sequence generated based on the scrambling parameter, an interleaving manner indicated by the interleaving parameter, the bit-group-to-symbol-group mapping rule, and the spreading factor in the foregoing second non-orthogonal access parameter; then maps, based on the transmit power in the second non-orthogonal access parameter, the second symbol sequence to a second time-frequency resource, to obtain a signal that carries the uplink control information; and sends, to the network device, the signal that carries the uplink control information.

It should be noted that in the process in which the terminal device performs the method shown in FIG. 3 on the uplink data or the uplink control information, after performing a resource mapping operation on the second symbol sequence, the terminal device obtains the signal that carries the uplink data or the signal that carries the uplink control information.

That the first non-orthogonal access parameter is different from the second non-orthogonal access parameter includes:
the first non-orthogonal access parameter and the second non-orthogonal access parameter include different non-orthogonal access spreading factors; and/or
the first non-orthogonal access parameter and the second non-orthogonal access parameter include different bit-group-to-symbol-group mapping ml es; and/or
the first non-orthogonal access parameter and the second non-orthogonal access parameter include different interleaving parameters; and/or
the first non-orthogonal access parameter and the second non-orthogonal access parameter include different scrambling parameters; and/or
the first non-orthogonal access parameter and the second non-orthogonal access parameter include different transmit powers.

Specifically, the terminal device performs a spreading operation on the uplink data and the uplink control information by using different spreading factors; and/or performs an interleaving operation on the uplink data and the uplink control information in different interleaving manners; and/or performs a scrambling operation on the uplink data and the uplink control information by using different scrambling sequences/complex scrambling sequences; and/or performs symbol mapping on the uplink data and the uplink control information by using different bit-group-to-symbol-group mapping rules; and/or sends, at different transmit powers, the signal that carries the uplink data and the signal that carries the uplink control information to the network device.

In an embodiment, the terminal device performs a spreading operation on the uplink data and the uplink control information by using a same spreading factor; and/or performs an interleaving operation on the uplink data and the uplink control information in a same interleaving manner; and/or performs a scrambling operation on the uplink data and the uplink control information by using a same scrambling sequence/complex scrambling sequence; and/or performs symbol mapping on the uplink data and the uplink control information by using a same bit-group-to-symbol-group mapping rule; and/or sends, at a same transmit power, the signal that carries the uplink data and the signal that carries the uplink control information to the network device.

It should be noted that, at least one of the following is different between the uplink data and the uplink control information: the spreading factors used when the terminal device performs the spreading operation on the uplink data and the uplink control information, the interleaving manners used when the terminal device performs the interleaving operation on the uplink data and the uplink control information, the scrambling sequences/complex scrambling sequences used when the terminal device performs the scrambling operation on the uplink data and the uplink control information, the bit-group-to-symbol-group mapping rules used when the terminal device performs the symbol mapping on the uplink data and the uplink control information, or the transmit powers used to send the signal that carries the uplink data and the signal that carries the uplink control information to the network device.

In an embodiment, the method further includes:
determining the second non-orthogonal access parameter based on a type of the uplink control information.

The uplink control information includes one or more of the following information: a channel quality indicator (CQI), a rank indicator (RI), a precoding matrix indicator (PMI), a scheduling request (SR), or a hybrid automatic repeat request acknowledgment (HARQ-ACK), or the like.

In an implementation, the uplink control information includes first uplink control information and second uplink control information.

Correspondingly, the determining the second non-orthogonal access parameter based on a type of the uplink control information includes:
determining, based on a type of the first uplink control information, a second non-orthogonal access parameter corresponding to the first uplink control information; and
determining, based on a type of the second uplink control information, a second non-orthogonal access parameter corresponding to the second uplink control information.

The first uplink control information includes one or more of a CQI, an RI, a PMI, an SR, or a HARQ-ACK, and the second uplink control information includes one or more of a CQI, an RI, a PMI, an SR, or a HARQ-ACK. In addition, the information included in the first uplink control information is different from the information included in the second uplink control information.

The second non-orthogonal access parameter corresponding to the first uplink control information is different from the second non-orthogonal access parameter corresponding to the second uplink control information. Specifically, the second non-orthogonal access parameter corresponding to the first uplink control information and the second non-orthogonal access parameter corresponding to the second uplink control information include different non-orthogonal access spreading factors; and/or the first non-orthogonal access parameter and the second non-orthogonal access parameter include different bit-group-to-symbol-group mapping rules; and/or the second non-orthogonal access parameter corresponding to the first uplink control information and the second non-orthogonal access parameter corresponding to the second uplink control information include different interleaving parameters; and/or the second non-orthogonal access parameter corresponding to the first uplink control information and the second non-orthogonal access parameter corresponding to the second uplink control information include different scrambling parameters; and/or the second non-orthogonal access parameter corresponding to the first uplink control information and the second non-orthogonal access parameter corresponding to the second uplink control information include different transmit powers.

In an embodiment, the method further includes:
determining the second time-frequency resource based on the type of the uplink control information.

In an implementation, the determining the second time-frequency resource based on the type of the uplink control information includes:
determining, based on the type of the first uplink control information, a second time-frequency resource occupied by a signal that carries the first uplink control information; and
determining, based on the type of the second uplink control information, a second time-frequency resource occupied by a signal that carries the second uplink control information.

The second time-frequency resource occupied by the signal that carries the first uplink control information overlaps the second time-frequency resource occupied by the signal that carries the second uplink control information.

The second time-frequency resource occupied by the signal that carries the first uplink control information partially overlaps the second time-frequency resource occupied by the signal that carries the second uplink control information; or the second time-frequency resource occupied by the signal that carries the first uplink control information is completely the same as the second time-frequency resource occupied by the signal that carries the second uplink control information; or the second time-frequency resource occupied by the signal that carries the first uplink control information includes the second time-frequency resource occupied by the signal that carries the second uplink control information.

In an embodiment, in the process of generating the signal that carries the uplink control information, the first uplink control information and the second uplink control information are encoded as a whole.

In an embodiment, in the process of generating the signal that carries the uplink control information, the first uplink control information and the second uplink control information are separately encoded.

Further, the uplink control information further includes third uplink control information. The third uplink control information includes any one or more of a CQI, an RI, a PMI, an SR, or a HARQ-ACK. In addition, the third uplink control information is different from the information included in the first uplink control information and the information included in the second uplink control information. The terminal device determines, based on a type of the third uplink control information, a second non-orthogonal access parameter corresponding to the third uplink control information, and determines, based on the type of the third uplink control information, a second time-frequency resource occupied by a signal that carries the third uplink control information.

The second non-orthogonal access parameter corresponding to the third uplink control information is different from both the second non-orthogonal access parameter corresponding to the first uplink control information and the second non-orthogonal access parameter corresponding to the second uplink control information. Alternatively, the second non-orthogonal access parameter corresponding to the third uplink control information is different from the second non-orthogonal access parameter corresponding to the first uplink control information, and is the same as the second non-orthogonal access parameter corresponding to the second uplink control information. Alternatively, the second non-orthogonal access parameter corresponding to the third uplink control information is different from the second non-orthogonal access parameter corresponding to the second uplink control information, and is the same as the second non-orthogonal access parameter corresponding to the first uplink control information.

The second time-frequency resource occupied by the signal that carries the third uplink control information partially overlaps the second time-frequency resource occupied by the signal that carries the first uplink control information and the second time-frequency resource occupied by the signal that carries the second uplink control information. Alternatively, the second time-frequency resource occupied by the signal that carries the third uplink control information partially overlaps the second time-frequency resource occupied by the signal that carries the first uplink control information, and does not overlap the second time-frequency resource occupied by the signal that carries the second uplink control information. Alternatively, the second time-frequency resource occupied by the signal that carries the third uplink control information partially overlaps the second time-frequency resource occupied by the signal that carries the second uplink control information, and does not overlap the second time-frequency resource occupied by the signal that carries the first uplink control information. Alternatively, the second time-frequency resource occupied by the signal that carries the third uplink control information does not overlap the second time-frequency resource occupied by the signal that carries the first uplink control information and the second time-frequency resource occupied by the signal that carries the second uplink control information. Alternatively, the second time-frequency resource occupied by the signal that carries the third uplink control information includes the second time-frequency resource occupied by the signal that carries the first uplink control information and the second time-frequency resource occupied by the signal that carries the second uplink control information.

In the process of generating the signal that carries the uplink control information, the terminal device encodes the first uplink control information, the second uplink control information, and the third uplink control information as a whole.

Alternatively, the terminal device separately encodes the first uplink control information, the second uplink control information, and the third uplink control information.

In an embodiment, the method further includes:
obtaining, based on the type of the uplink control information, configuration information used to determine the second non-orthogonal access parameter.

When the terminal device sends the uplink control information to the network device, the terminal device needs to obtain the configuration information, where the configuration information includes the second non-orthogonal access parameter. The configuration information may be sent by the network device to the terminal, or may be determined by the terminal device based on a communication protocol between the terminal device and the network device.

It should be noted that, for the operations such as encoding, bit interleaving, bit scrambling, symbol mapping, symbol scrambling, and symbol interleaving, when a specific parameter of any operation is not specified by a non-orthogonal access parameter, the terminal device uses a default manner for the operation. For example, when the non-orthogonal access parameter includes an encoding parameter, a spreading factor, and an interleaving parameter, the terminal device performs encoding, bit interleaving, bit scrambling, symbol mapping, symbol scrambling, and symbol interleaving on the uplink control information or the uplink data based on a channel encoding scheme indicated by the encoding parameter, a default bit-group-to-symbol-group mapping rule, a spreading factor, a default scrambling sequence, a default complex scrambling sequence, and an interleaving manner indicated by the interleaving parameter, and performs resource mapping based on a default transmit power, to obtain the signal that carries the uplink control information or the signal that carries the uplink data, where a mapped resource is a default time-frequency resource. The terminal device sends, to the network device, the signal that carries the uplink control information or the signal that carries the uplink data.

S203: The terminal device sends the signal that carries the uplink data and the signal that carries the uplink control information.

It can be learned that in the solution in this embodiment of this application, the network device sends first configuration information and second configuration information to the terminal device, where the first configuration information includes information about the first non-orthogonal access parameter used to transmit the uplink data and information about the first time-frequency resource used to transmit the uplink data, and the second configuration information includes information about the second non-orthogonal access parameter used to transmit the uplink control information on the second time-frequency resource. The first non-orthogonal access parameter is different from the second non-orthogonal access parameter, and the first time-frequency resource overlaps the second time-frequency resource. The terminal device generates the signal that carries the uplink data based on the first non-orthogonal access parameter and generates the signal that carries the uplink control information based on the second non-orthogonal access parameter, and sends, to the network device on the first time-frequency resource, the signal that carries the uplink data and sends, to the network device on the second time-frequency resource, the signal that carries the uplink control information. Compared with the prior art, the terminal device sends, to the network device in a non-orthogonal multiplexing manner, the signal that carries the uplink control information and the signal that carries the uplink data. This helps improve time-frequency resource utilization.

FIG. 4 is a schematic flowchart of a method for transmitting an uplink signal according to an embodiment of this application. As shown in FIG. 4, the method includes the following steps.

S401: A network device sends first configuration information and second configuration information to a terminal device, where the first configuration information includes information about a first non-orthogonal access parameter used to transmit uplink data and information about a first time-frequency resource used to transmit the uplink data, and the second configuration information includes information about a second non-orthogonal access parameter used to transmit uplink control information, where the first non-orthogonal access parameter is different from the second orthogonal access parameter.

In an embodiment, the second configuration information further includes information about a second time-frequency resource used to transmit the uplink control information, and the second time-frequency resource overlaps the second time-frequency resource.

In an embodiment, the network device determines, based on a protocol followed by the network device and the terminal device, information about a second time-frequency resource used to transmit the uplink control information, and the second time-frequency resource overlaps the first time-frequency resource. For example, the protocol specifies that some specified resources in scheduling resources (for example, first time-frequency resources) are used to send the uplink control information.

The first non-orthogonal access parameter and the second non-orthogonal access parameter include different non-orthogonal access spreading factors; and/or the first non-orthogonal access parameter and the second non-orthogonal access parameter include different bit-group-to-symbol-group mapping nil es; and/or the first non-orthogonal access parameter and the second non-orthogonal access parameter include different interleaving parameters; and/or the first non-orthogonal access parameter and the second non-orthogonal access parameter include different scrambling parameters; and/or the first non-orthogonal access parameter and the second non-orthogonal access parameter include different transmit powers.

The interleaving parameter is used to indicate an interleaving manner used when the uplink data or the uplink control information is interleaved; and the scrambling parameter is used to generate a scrambling sequence or a complex scrambling sequence used to scramble the uplink data or the uplink control information.

Specifically, that the first time-frequency resource overlaps the second time-frequency resource includes: the first time-frequency resource partially overlaps the second time-frequency resource, or the first time-frequency resource is completely the same as the second time-frequency resource, or the first time-frequency resource includes the second time-frequency resource.

In an embodiment, the second information further includes information about a second time-frequency resource.

The second time-frequency resource is determined based on a type of the uplink control information.

The uplink control information includes one or more of information such as a CQI, an RI, a PMI, an SR, or a HARQ-ACK.

The second non-orthogonal access parameter is determined based on the type of the uplink control information.

Further, the uplink control information includes first uplink control information and second uplink control information, the information about the second non-orthogonal access parameter used to transmit the uplink control information includes information about a second non-orthogonal access parameter used to transmit the first uplink control information and information about a second non-orthogonal access parameter used to transmit the second uplink control information.

The first uplink control information includes one or more of a CQI, an RI, a PMI, an SR, or a HARQ-ACK, and the second uplink control information includes one or more of a CQI, an RI, a PMI, an SR, or a HARQ-ACK. In addition, the information included in the first uplink control information is different from the information included in the second uplink control information.

The second non-orthogonal access parameter of the first uplink control information is different from the second non-orthogonal access parameter of the second uplink control information. Specifically, the second non-orthogonal access parameter of the first uplink control information and the second non-orthogonal access parameter of the second uplink control information include different non-orthogonal access spreading factors; and/or the second non-orthogonal access parameter of the first uplink control information and the second non-orthogonal access parameter of the second uplink control information include different bit-group-to-symbol-group mapping rules; and/or the second non-orthogonal access parameter of the first uplink control information and the second non-orthogonal access parameter of the second uplink control information include different interleaving parameters; and/or the second non-orthogonal access parameter of the first uplink control information and the second non-orthogonal access parameter of the second uplink control information include different scrambling parameters; and/or the second non-orthogonal access parameter of the first uplink control information and the second non-orthogonal access parameter of the second uplink control information include different transmit powers.

Further, second time-frequency resources include a second time-frequency resource used to transmit the first uplink control information and a second time-frequency resource used to transmit the second uplink control information.

S402: The network device receives an uplink signal sent by the terminal device, where uplink signals include a signal that is generated based on the first non-orthogonal access parameter and that carries the uplink data and a signal that is generated based on the first non-orthogonal access parameter and that carries the uplink control information, the signal that carries the uplink data occupies the first time-frequency resource, and the signal that carries the uplink control information occupies the second time-frequency resource.

After the network device receives, from the terminal device, the signal that carries the uplink data and the signal that carries the uplink control information, the network device performs, based on the first non-orthogonal access parameter, de-operations on the signal that carries the uplink data, and performs, based on the second non-orthogonal access parameter, de-operations on the signal that carries the uplink control information. The de-operations include operations such as de-symbol interleaving, de-symbol scrambling, de-spreading, de-symbol mapping, de-bit interleaving, de-bit scrambling, and decoding, to obtain the uplink data and the uplink control information.

It should be noted that, for the operations such as de-symbol interleaving, de-symbol scrambling, de-symbol mapping, de-bit scrambling, de-bit interleaving, and decoding, when a specific parameter of any operation is not specified by a non-orthogonal access parameter, the network device uses a default manner for the operation. For example, when the non-orthogonal access parameter includes an encoding parameter, a spreading factor, and an interleaving parameter, the network device performs de-symbol interleaving, de-symbol scrambling, de-symbol mapping, de-symbol scrambling, de-symbol interleaving, and decoding on the signal that carries the uplink data or the signal that carries the uplink control information based on an interleaving manner indicated by the interleaving parameter, a default complex scrambling sequence, the spreading factor, a default bit-group-to-symbol-group mapping rule, a default scrambling sequence, and a channel encoding manner indicated by the encoding parameter, to obtain the uplink data or the uplink control information.

In a specific application scenario, a single terminal device sends uplink control information and uplink data to the network device. The uplink control information includes CSI and a HARQ-ACK. The CSI includes a CQI, a PMI, and an RI.

As shown in FIG. 5, the foregoing uplink control information includes first uplink control information, second uplink control information, and third uplink control information. The first uplink control information includes the foregoing CQI/PMI, the second uplink control information includes the foregoing RI, and the third uplink control information includes the foregoing HARQ-ACK.

After the terminal device receives first configuration information and second configuration information sent by a network device, the first configuration information includes information about a first non-orthogonal access parameter used to transmit uplink data and information about a first time-frequency resource used to transmit the uplink data, and the second configuration information includes information about a second non-orthogonal access parameter used to transmit uplink control information and information about a second time-frequency resource used to transmit the uplink control information. The information about the second non-orthogonal access parameter used to transmit the uplink control information includes information about a second non-orthogonal access parameter used to transmit the first uplink control information, information about a second non-orthogonal access parameter used to transmit the second uplink control information, and information about a second non-orthogonal access parameter used to transmit the third uplink control information. The information about the second time-frequency resource used to transmit the uplink control information includes information about a second time-frequency resource used to transmit the first uplink control information, information about a second time-frequency resource used to transmit the second uplink control information, and information about a second time-frequency resource used to transmit the third uplink control information. The terminal device obtains, from the first configuration information, the first non-orthogonal access parameter used to transmit the uplink data and the first time-frequency resource used to transmit the uplink data; and obtains, from the second configuration information based on a type of the uplink control information, the second non-orthogonal access parameter used to transmit the first uplink control information and the second time-frequency resource used to transmit the first uplink control information, the second non-orthogonal access parameter used to transmit the second uplink control information and the second time-frequency resource used to transmit the second uplink control information, and the second non-orthogonal access parameter used to transmit the third uplink control information and the second time-frequency resource used to transmit the third uplink control information.

The terminal device performs encoding, bit interleaving, bit scrambling, symbol mapping, symbol scrambling, and symbol interleaving on the uplink data based on the first non-orthogonal access parameter of the uplink data, to obtain a signal that carries the first uplink data. The terminal device performs encoding, bit interleaving, bit scrambling, symbol mapping, symbol scrambling, and symbol interleaving on the first uplink control information, the second uplink control information, and the third uplink control information respectively based on the second non-orthogonal access parameter of the first uplink control information, the second non-orthogonal access parameter of the second uplink control information, and the second non-orthogonal access parameter of the third uplink control information, to obtain a signal that carries the first uplink control information, a signal that carries the second uplink control information, and a signal that carries the third uplink control information.

The second non-orthogonal access parameter of the first uplink control information, the second non-orthogonal access parameter of the second uplink control information, and the second non-orthogonal access parameter of the third uplink control information are different from each other, partially the same, or all the same.

Specifically, the second non-orthogonal access parameter of the first uplink control information, the second non-orthogonal access parameter of the second uplink control information, and the second non-orthogonal access parameter of the third uplink control information include different spreading factors; and/or the second non-orthogonal access parameter of the first uplink control information, the second non-orthogonal access parameter of the second uplink control information, and the second non-orthogonal access parameter of the third uplink control information include different bit-group-to-symbol-group mapping rules; and/or the second non-orthogonal access parameter of the first uplink control information, the second non-orthogonal access parameter of the second uplink control information, and the second non-orthogonal access parameter of the third uplink control information include different interleaving parameters; and/or the second non-orthogonal access parameter of the first uplink control information, the second non-orthogonal access parameter of the second uplink control information, and the second non-orthogonal access parameter of the third uplink control information include different scrambling parameters; and/or the second non-orthogonal access parameter of the first uplink control information, the second non-orthogonal access parameter of the second uplink control information, and the second non-orthogonal access parameter of the third uplink control information include different transmit powers.

In other words, the terminal device separately uses different channel encoding schemes for the three pieces of uplink control information; and/or uses different bit interleaving manners for the three pieces of uplink control information; and/or uses different scrambling sequences for the three pieces of uplink control information; and/or uses different bit-group-to-symbol-group mapping rules for the three pieces of uplink control information; and/or uses different symbol interleaving manners for the three pieces of uplink control information; and/or uses different complex scrambling sequences for the three pieces of uplink control information; and/or uses different spreading factors for the three pieces of uplink control information. The terminal device respectively maps the signal that carries the first uplink control information, the signal that carries the second uplink control information, and the signal that carries the third uplink control information to the second time-frequency resource for transmitting the first uplink information, the second time-frequency resource for transmitting the second uplink information, and the second time-frequency resource for transmitting the third uplink information, and sends, at different transmit powers, the signals to the network device.

Similarly, the terminal device maps the signal that carries the data to the first time-frequency resource used to transmit the uplink data, and sends, at a transmit power in the first non-orthogonal access parameter, the signal to the network device.

As shown in FIG. 5, the first time-frequency resource used to transmit the uplink data includes the second time-frequency resource used to transmit the first uplink control information, the second time-frequency resource used to transmit the second uplink control information, and the second time-frequency resource used to transmit the third uplink control information. In addition, the second time-frequency resource used to transmit the first uplink control information, the second time-frequency resource used to transmit the second uplink control information, and the second time-frequency resource used to transmit the third uplink control information do not overlap each other.

Figure 6:
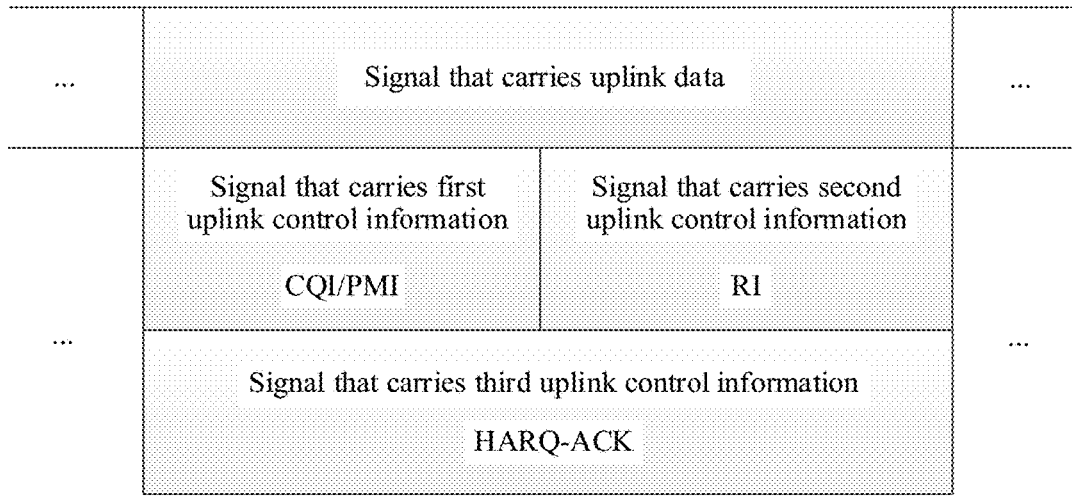
FIG. 6 is another schematic diagram of transmitting an uplink signal according to an embodiment of this application.

For another example, as shown in FIG. 6, the first time-frequency resource used to transmit the uplink data is the same as the second time-frequency resource used to transmit the third uplink control information. The second time-frequency resource used to transmit the third uplink control information includes the second time-frequency resource used to transmit the first uplink control information and the second time-frequency resource used to transmit the second uplink control information. In addition, the second time-frequency resource used to transmit the first uplink control information and the second time-frequency resource used to transmit the second uplink control information does not overlap.

After the network device receives the signal that carries the first uplink control information, the signal that carries the second uplink control information, and the signal that carries the third uplink control information, the network device separately performs de-symbol interleaving, de-symbol scrambling, de-spreading, de-symbol mapping, de-bit interleaving, de-bit scrambling, and decoding on the signal that carries the first uplink control information, the signal that carries the second uplink control information and the signal that carries the third uplink control information based on an interleaving manner determined by the interleaving parameter, a scrambling sequence and a complex scrambling sequence that are generated by the scrambling parameter, the bit-group-to-symbol-group mapping rule, the spreading factor, and a channel encoding scheme indicated by the encoding parameter in the corresponding second non-orthogonal access parameter, to obtain the first uplink control information, the second uplink control information, and the third uplink control information.

Similarly, after receiving the signal that carries the uplink data, the network device performs de-symbol interleaving, de-symbol scrambling, de-spreading, de-symbol mapping, de-bit interleaving, de-bit scrambling, and decoding on the signal that carries the uplink data based on the first non-orthogonal access parameter used to transmit the uplink data, to obtain the uplink data.

In a specific application scenario, a plurality of terminal devices transmit uplink control information and uplink data to the network device. The uplink control information includes CSI and a HARQ-ACK. The CSI includes the control information block and includes a CQI, a PMI, and an RI.

Uplink control information of a terminal device 1 includes first uplink control information, second uplink control information, and third uplink control information. The first uplink control information includes the CQI/PMI, the second uplink control information includes the RI, and the third uplink control information includes the HARQ-ACK. Uplink control information of a terminal device 2 includes fourth uplink control information, fifth uplink control information, and sixth uplink control information. The fourth uplink control information includes the CQI/PMI, the fifth uplink control information includes the RI, and the sixth uplink control information includes the HARQ-ACK.

After the terminal device 1 receives first configuration information and second configuration information sent by the network device, the first configuration information includes information about a first non-orthogonal access parameter used to transmit uplink data of the terminal device 1 and information about a first time-frequency resource used to transmit the uplink data of the terminal device 1, and the second configuration information includes information about a second non-orthogonal access parameter used to transmit uplink control information of the terminal device 1 and information about a second time-frequency resource used to transmit the uplink control information of the terminal device 1. The information about the second non-orthogonal access parameter used to transmit the uplink control information of the terminal device 1 includes information about a second non-orthogonal access parameter used to transmit the first uplink control information, information about a second non-orthogonal access parameter used to transmit the second uplink control information, and information about a second non-orthogonal access parameter used to transmit the third uplink control information. The information about the second time-frequency resource used to transmit the uplink control information of the terminal device 1 includes information about a second time-frequency resource used to transmit the first uplink control information, information about a second time-frequency resource used to transmit the second uplink control information, and information about a second time-frequency resource used to transmit the third uplink control information. The terminal device 1 obtains, from the first configuration information, the first non-orthogonal access parameter used to transmit the uplink data of the terminal device 1 and the first time-frequency resource used to transmit the uplink data of the terminal device 1; and obtains, from the second configuration information based on a type of the uplink control information of the terminal device 1, the second non-orthogonal access parameter used to transmit the first uplink control information and the second time-frequency resource used to transmit the first uplink control information, the second non-orthogonal access parameter used to transmit the second uplink control information and the second time-frequency resource used to transmit the second uplink control information, and the second non-orthogonal access parameter used to transmit the third uplink control information and the second time-frequency resource used to transmit the third uplink control information.

Similarly, the terminal device 2 receives third configuration information and fourth configuration information that are sent by the network device. The third configuration information includes information about a first non-orthogonal access parameter used to transmit uplink data of the terminal device 2 and information about a first time-frequency resource used to transmit the uplink data of the terminal device 2, and the fourth configuration information includes information about a second non-orthogonal access parameter used to transmit uplink control information of the terminal device 2 and information about a second time-frequency resource used to transmit the uplink control information of the terminal device 2. The information about the second non-orthogonal access parameter used to transmit the uplink control information of the terminal device 2 includes information about a second non-orthogonal access parameter used to transmit the fourth uplink control information, information about a second non-orthogonal access parameter used to transmit the fifth uplink control information, and information about a second non-orthogonal access parameter used to transmit the sixth uplink control information. The information about the second time-frequency resource used to transmit the uplink control information of the terminal device 2 includes information about a second time-frequency resource used to transmit the fourth uplink control information, information about a second time-frequency resource used to transmit the fifth uplink control information, and information about a second time-frequency resource used to transmit the sixth uplink control information. The terminal device 2 obtains, from the third configuration information, the first non-orthogonal access parameter used to transmit the uplink data of the terminal device 2 and the first time-frequency resource used to transmit the uplink data of the terminal device 2; and obtains, from the second configuration information based on a type of the uplink control information of the terminal device 2, the second non-orthogonal access parameter used to transmit the fourth uplink control information and the second time-frequency resource used to transmit the fourth uplink control information, the second non-orthogonal access parameter used to transmit the fifth uplink control information and the second time-frequency resource used to transmit the fifth uplink control information, and the second non-orthogonal access parameter used to transmit the sixth uplink control information and the second time-frequency resource used to transmit the sixth uplink control information.

The terminal device 1 performs channel encoding, bit interleaving, bit scrambling, symbol mapping, spreading, symbol scrambling, and symbol interleaving on the uplink data based on the first non-orthogonal access parameter corresponding to the uplink data of the terminal device 1, to obtain a signal that carries the uplink data of the terminal device 1; and performs channel encoding, bit interleaving, bit scrambling, symbol mapping, spreading, symbol scrambling, and symbol interleaving on the first uplink control information, the second uplink control information, and the third uplink control information respectively based on the second non-orthogonal access parameter corresponding to the first uplink control information, the second non-orthogonal access parameter corresponding to the second uplink control information, and the second non-orthogonal access parameter corresponding to the third uplink control information, to obtain a signal that carries the first uplink control information, a signal that carries the second uplink control information, and a signal that carries the third uplink control information. Similarly, the terminal device 2 performs channel encoding, bit interleaving, bit scrambling, symbol mapping, spreading, symbol scrambling, and symbol interleaving on the uplink data based on the first non-orthogonal access parameter corresponding to the uplink data of the terminal device 2, to obtain a signal that carries the uplink data of the terminal device 2; and performs channel encoding, bit interleaving, bit scrambling, symbol mapping, spreading, symbol scrambling, and symbol interleaving on the fourth uplink control information, the fifth uplink control information, and the sixth uplink control information respectively based on the second non-orthogonal access parameter corresponding to the fourth uplink control information, the second non-orthogonal access parameter corresponding to the fifth uplink control information, and the second non-orthogonal access parameter corresponding to the sixth uplink control information, to obtain a signal that carries the fourth uplink control information, a signal that carries the fifth uplink control information, and a signal that carries the sixth uplink control information.

The second non-orthogonal access parameter corresponding to the first uplink control information, the second non-orthogonal access parameter corresponding to the second uplink control information, the second non-orthogonal access parameter corresponding to the third uplink control information, the second non-orthogonal access parameter corresponding to the fourth uplink control information, the second non-orthogonal access parameter corresponding to the fifth uplink control information, and the second non-orthogonal access parameter corresponding to the sixth uplink control information are different from each other, partially the same, or all the same. For details, refer to the foregoing related descriptions.

The terminal device 1 respectively maps the signal that carries the first uplink control information, the signal that carries the second uplink control information, and the signal that carries the third uplink control information to the second time-frequency resource for transmitting the first uplink information, the second time-frequency resource for transmitting the second uplink information, and the second time-frequency resource for transmitting the third uplink information, and sends, at different transmit powers, the signals to the network device. Similarly, the terminal device 2 respectively maps the signal that carries the fourth uplink control information, the signal that carries the fifth uplink control information, and the signal that carries the sixth uplink control information to the second time-frequency resource for transmitting the fourth uplink information, the second time-frequency resource for transmitting the fifth uplink information, and the second time-frequency resource for transmitting the sixth uplink information, and sends, at different transmit powers, the signals to the network device.

Figure 7:
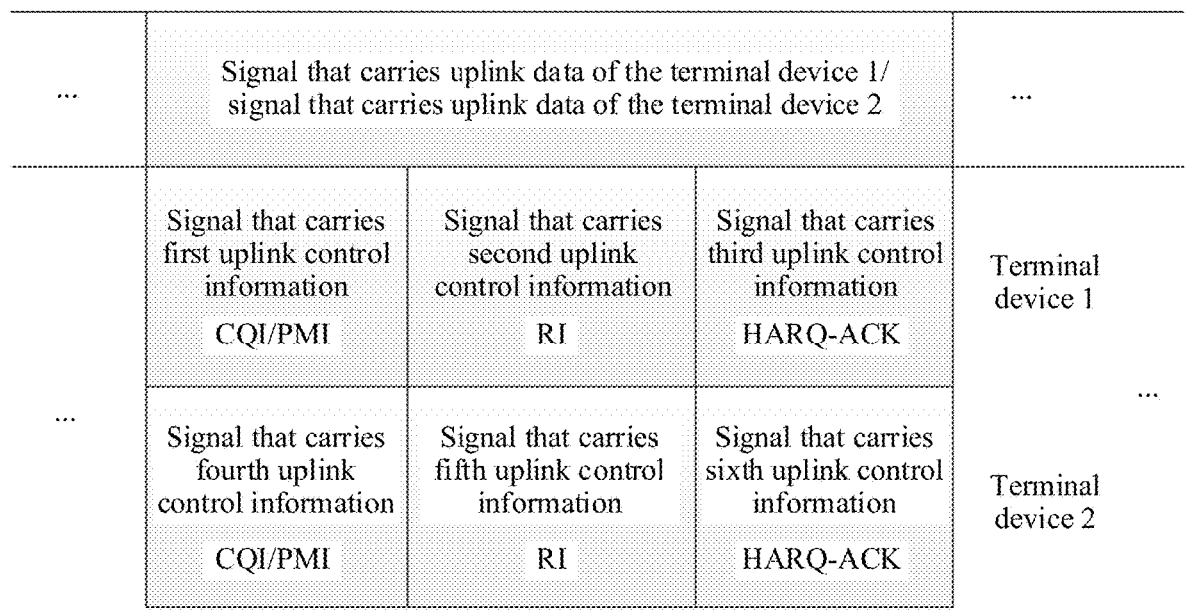
FIG. 7 is another schematic diagram of transmitting an uplink signal according to an embodiment of this application.

As shown in FIG. 7, the first time-frequency resource used to transmit the uplink data of the terminal device 1 includes the second time-frequency resource used to transmit the first uplink control information, the second time-frequency resource used to transmit the second uplink control information, and the second time-frequency resource used to transmit the third uplink control information. In addition, the second time-frequency resource used to transmit the first uplink control information, the second time-frequency resource used to transmit the second uplink control information, and the second time-frequency resource used to transmit the third uplink control information do not overlap each other. The first time-frequency resource used to transmit the uplink data of the terminal device 2 includes the second time-frequency resource used to transmit the fourth uplink control information, the second time-frequency resource used to transmit the fifth uplink control information, and the second time-frequency resource used to transmit the sixth uplink control information. In addition, the second time-frequency resource used to transmit the fourth uplink control information, the second time-frequency resource used to transmit the fifth uplink control information, and the second time-frequency resource used to transmit the sixth uplink control information do not overlap each other.

The second time-frequency resource used to transmit the first uplink control information overlaps the second time-frequency resource used to transmit the fourth uplink control information, and does not overlap the second time-frequency resource used to transmit the fifth uplink control information and the second time-frequency resource used to transmit the sixth uplink control information; the second time-frequency resource used to transmit the second uplink control information overlaps the second time-frequency resource used to transmit the fifth uplink control information, and does not overlap the second time-frequency resource used to transmit the fourth uplink control information and the second time-frequency resource used to transmit the sixth uplink control information; and the second time-frequency resource used to transmit the third uplink control information overlaps the second time-frequency resource used to transmit the sixth uplink control information, and does not overlap the second time-frequency resource used to transmit the fourth uplink control information and the second time-frequency resource used to transmit the fifth uplink control information.

Figure 8:
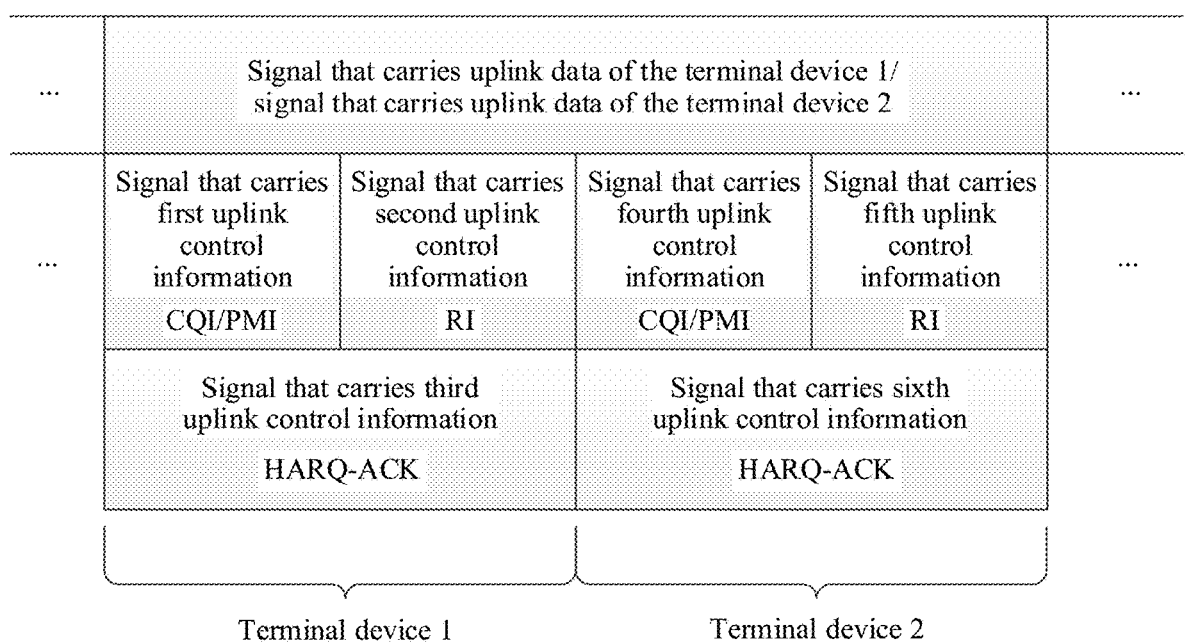
FIG. 8 is another schematic diagram of transmitting an uplink signal according to an embodiment of this application.

For another example, as shown in FIG. 8, the first time-frequency resource used to transmit the uplink data of the terminal device 1 includes the second time-frequency resource used to transmit the first uplink control information, the second time-frequency resource used to transmit the second uplink control information, and the second time-frequency resource used to transmit the third uplink control information. In addition, the second time-frequency resource used to transmit the third uplink control information includes the second time-frequency resource used to transmit the first uplink control information and the second time-frequency resource used to transmit the second uplink control information. The second time-frequency resource used to transmit the first uplink control information and the second time-frequency resource used to transmit the second uplink control information does not overlap. The first time-frequency resource used to transmit the uplink data of the terminal device 2 includes the second time-frequency resource used to transmit the fourth uplink control information, the second time-frequency resource used to transmit the fifth uplink control information, and the second time-frequency resource used to transmit the sixth uplink control information. In addition, the second time-frequency resource used to transmit the sixth uplink control information includes the second time-frequency resource used to transmit the fourth uplink control information and the second time-frequency resource used to transmit the fifth uplink control information. The second time-frequency resource used to transmit the fourth uplink control information and the second time-frequency resource used to transmit the fifth uplink control information does not overlap.

The second time-frequency resource used to transmit the third uplink control information and the second time-frequency resource used to transmit the sixth uplink control information does not overlap. The first time-frequency resource used to transmit the uplink data of the terminal 1 may be the same as the first time-frequency resource used to transmit the uplink data of the terminal device 2, and a part of the first time-frequency resource used to transmit the uplink data of the terminal 1 may be further used to transmit the uplink control information of the terminal device 1. Another part of the first time-frequency resource used to transmit the uplink data of the terminal 1 may be further used to transmit the uplink control information of the terminal device 2.

After the network device receives the signal that carries the first uplink control information, the signal that carries the second uplink control information, the signal that carries the third uplink control information, the signal that carries the fourth uplink control information, the signal that carries the fifth uplink control information, and the signal that carries the sixth uplink control information, the network device separately performs de-symbol interleaving, de-symbol scrambling, de-spreading, de-symbol mapping, de-bit interleaving, de-bit scrambling, and decoding on the signal that carries the first uplink control information, the signal that carries the second uplink control information and the signal that carries the third uplink control information based on an interleaving manner determined by the interleaving parameter, a scrambling sequence and a complex scrambling sequence that are generated by the scrambling parameter, the bit-group-to-symbol-group mapping rule, the spreading factor, and a channel encoding scheme indicated by the encoding parameter in the corresponding second non-orthogonal access parameter, to obtain the first uplink control information, the second uplink control information, the third uplink control information, the fourth uplink control information, the fifth uplink control information, and the sixth uplink control information.

Similarly, after the network device receives the signal that carries the uplink data of the terminal device 1 and the signal that carries the uplink data of the terminal device 2, the network device performs de-symbol interleaving, de-symbol scrambling, de-spreading, de-symbol mapping, de-bit interleaving, de-bit scrambling, and decoding on the signal that carries the uplink data of the terminal device 1 and the signal that carries the uplink data of the terminal device 2 respectively based on the first non-orthogonal access parameter used to transmit the uplink data of the terminal device 1 and the first non-orthogonal access parameter used to transmit the uplink data of the terminal device 2, to obtain the uplink data of the terminal device 1 and the uplink data of the terminal device 2.

Figure 9:
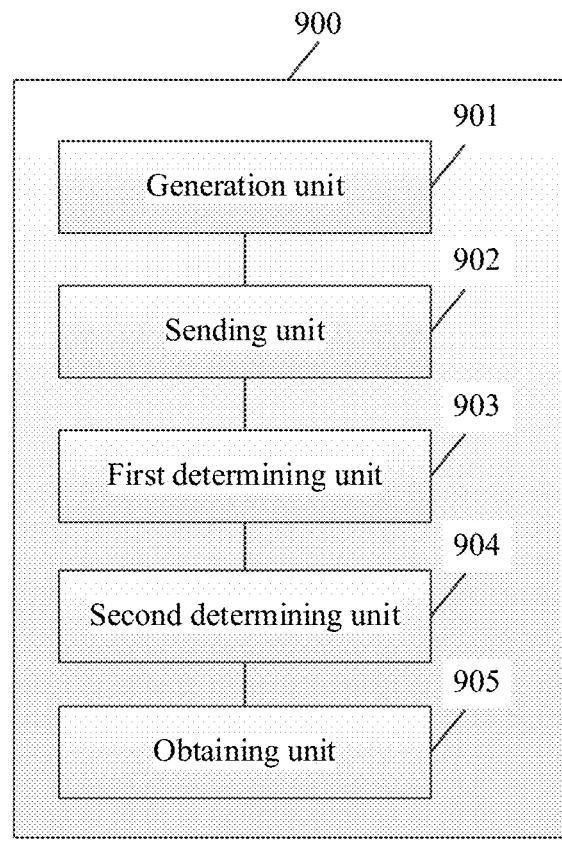
FIG. 9 is a schematic structural diagram of a communications apparatus according to an embodiment of this application.

FIG. 9 is a schematic structural diagram of a communications apparatus according to an embodiment of the present invention. As shown in FIG. 9, the communications apparatus 900 includes:

a generation unit 901, configured to generate, based on a first non-orthogonal access parameter, a signal that carries uplink data, where the signal that carries the uplink data occupies a first time-frequency resource.

The generation unit 901 is configured to generate, based on a second non-orthogonal access parameter, a signal that carries uplink control information, where the signal that carries the uplink control information occupies a second time-frequency resource, and the first time-frequency resource overlaps the second time-frequency resource; and the first non-orthogonal access parameter is different from the second non-orthogonal access parameter.

The first non-orthogonal access parameter and the second non-orthogonal access parameter include different non-orthogonal access spreading factors; and/or
  the first non-orthogonal access parameter and the second non-orthogonal access parameter include different bit-group-to-symbol-group mapping rules; and/or
  the first non-orthogonal access parameter and the second non-orthogonal access parameter include different interleaving parameters; and/or
  the first non-orthogonal access parameter and the second non-orthogonal access parameter include different scrambling parameters; and/or
  the first non-orthogonal access parameter and the second non-orthogonal access parameter include different transmit powers.

The communications apparatus 900 further includes a sending unit 902, configured to send the signal that carries the uplink data and the signal that carries the uplink control information.

In an embodiment, the communications apparatus 900 further includes:
  a first determining unit 903, configured to determine the second non-orthogonal access parameter based on a type of the uplink control information.

Further, the uplink control information includes first uplink control information and second uplink control information; and correspondingly, the first determining unit 903 is configured to:

determine, based on a type of the first uplink control information, a second non-orthogonal access parameter corresponding to the first uplink control information; and determine, based on a type of the second uplink control information, a second non-orthogonal access parameter corresponding to the second uplink control information.

In an embodiment, the communications apparatus 900 further includes:

a first determining unit 904, configured to determine the second time-frequency resource based on the type of the uplink control information.

Further the second determining unit 904 is configured to:

determine, based on the type of the first uplink control information, a second time-frequency resource occupied by a signal that carries the first uplink control information; and determine, based on the type of the second uplink control information, a second time-frequency resource occupied by a signal that carries the second uplink control information.

In an embodiment, in the process in which the generation unit 901 generates the signal that carries the uplink control information, the first uplink control information and the second uplink control information are encoded as a whole.

In an embodiment, in the process in which the generation unit 901 generates the signal that carries the uplink control information, the first uplink control information and the second uplink control information are separately encoded.

In an embodiment, the communications apparatus 900 further includes:

an obtaining unit 905, configured to obtain, based on the type of the uplink control information, configuration information used to determine the second non-orthogonal access parameter.

It should be noted that the foregoing units (the generation unit 901, the sending unit 902, the first determining unit 903, the second determining unit 904, and the obtaining unit 905) are configured to perform related steps of the method shown in FIG. 2.

In this embodiment, the communications apparatus 900 is presented in a form of a unit. The "unit" herein may be an application-specific integrated circuit (ASIC), a processor that executes one or more software or firmware programs, an integrated logic circuit, and/or another component that can provide the foregoing functions. When the communications apparatus is a terminal device, the foregoing unit may be an ASIC, a processor and a memory that execute one or more software or firmware programs, an integrated logic circuit, and/or another component that can provide the foregoing functions. In addition, the generation unit 901, the sending unit 902, the first determining unit 903, the second determining unit 904, and the obtaining unit 905 may be implemented by using a processor 1101 and a communications interface 1103 of a communications apparatus shown in FIG. 11.

Figure 10:
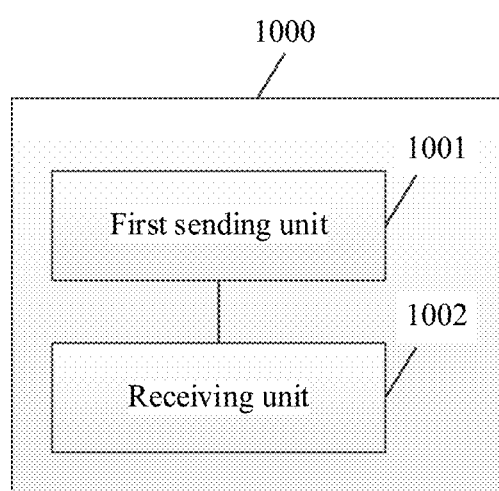
FIG. 10 is a schematic structural diagram of another communications apparatus according to an embodiment of this application.

FIG. 10 is a schematic structural diagram of a communications apparatus according to an embodiment of the present invention. As shown in FIG. 10, the terminal device 1000 includes:

a first sending unit 1001, configured to send first configuration information and second configuration information to a terminal device, where the first configuration information includes information about a first non-orthogonal access parameter used to transmit uplink data and information about a first time-frequency resource used to transmit the uplink data, and the second configuration information includes information about a second non-orthogonal access parameter used to transmit uplink control information on a second time-frequency resource, where the first non-orthogonal access parameter is different from the second orthogonal access parameter, and the first time-frequency resource overlaps the second time-frequency resource; and a receiving unit 1002, configured to receive an uplink signal sent by the terminal device, where uplink signals include a signal that is generated based on the first non-orthogonal access parameter and that carries the uplink data and a signal that is generated based on the first non-orthogonal access parameter and that carries the uplink control information, the signal that carries the uplink data occupies the first time-frequency resource, and the signal that carries the uplink control information occupies the second time-frequency resource.

In an embodiment, the first non-orthogonal access parameter and the second non-orthogonal access parameter include different non-orthogonal access spreading factors; and/or the first non-orthogonal access parameter and the second non-orthogonal access parameter include different bit-group-to-symbol-group mapping nil es; and/or the first non-orthogonal access parameter and the second non-orthogonal access parameter include different interleaving parameters; and/or the first non-orthogonal access parameter and the second non-orthogonal access parameter include different scrambling parameters; and/or the first non-orthogonal access parameter and the second non-orthogonal access parameter include different transmit powers.

In an embodiment, the second configuration information further includes information about the second time-frequency resource.

Further, the second time-frequency resource is determined based on a type of the uplink control information.

Further, the second non-orthogonal access parameter is determined based on the type of the uplink control information.

Specifically, the uplink control information includes first uplink control information and second uplink control information.

The information about the second non-orthogonal access parameter used to transmit the uplink control information includes information about a second non-orthogonal access parameter used to transmit the first uplink control information and information about a second non-orthogonal access parameter used to transmit the second uplink control information.

Specifically, second time-frequency resources include a second time-frequency resource used to transmit the first uplink control information and a second time-frequency resource used to transmit the second uplink control information.

It should be noted that the foregoing units (the first sending unit 1001 and the receiving unit 1002) are configured to perform related steps of the method shown in FIG. 4.

In this embodiment, the communications apparatus 1000 is presented in a form of a unit. The "unit" herein may be an ASIC, a processor that executes one or more software or firmware programs, an integrated logical circuit, and/or another component that can provide the foregoing functions.

When the communications apparatus 1000 is a network device, the foregoing unit may be an ASIC, a processor and a memory that execute one or more software or firmware programs, an integrated logic circuit, and/or another component that can provide the foregoing functions. In addition, the first sending unit 1001, the receiving unit 1002, and a second sending unit 1003 may be implemented by using the processor 1101 and the communications interface 1103 of a communications apparatus shown in FIG. 11.

Figure 11:
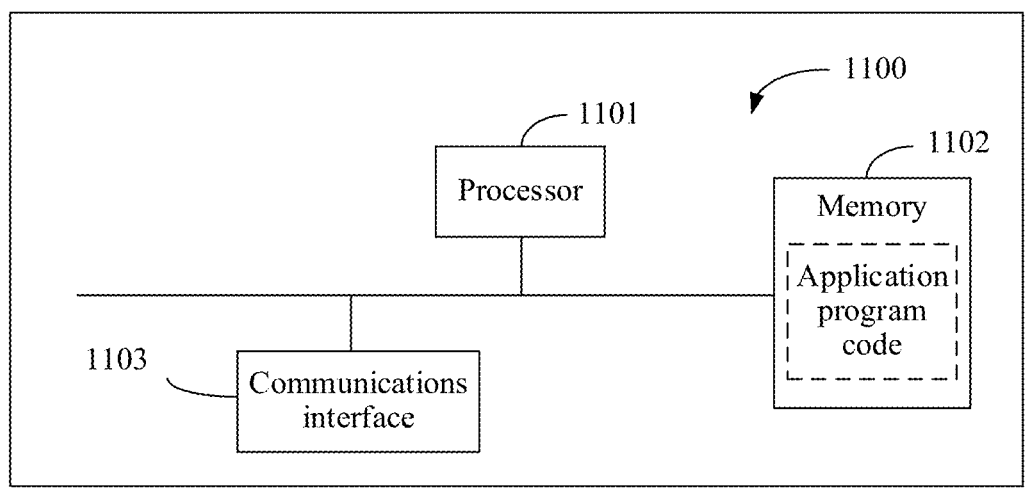
FIG. 11 is a schematic structural diagram of another communications apparatus according to an embodiment of this application.

FIG. 11 is a schematic structural diagram of a communications apparatus according to an embodiment of the present invention. As shown in FIG. 11, the communications apparatus 1100 includes at least one processor 1101 and at least one communications interface 1103. The processor 1101, the memory 1102, and the communications interface 1103 are connected and communicate with each other by using a communications bus.

The processor 1101 may be a general-purpose central processing unit (CPU), a microprocessor, an ASIC, or one or more integrated circuits for controlling program execution in the foregoing solutions.

The communications interface 1103 is configured to communicate with another element, device, or communications network, such as the Ethernet, a radio access network (RAN), or a wireless local area network (WLAN).

The communications apparatus further includes at least one memory 1102. The memory 1102 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory is not limited thereto. The memory may exist independently, and is connected to the processor by using a bus. Alternatively, the memory may be integrated with the processor.

The memory 1102 is configured to store application program code for executing the foregoing solution, and the processor 1101 controls the execution. The processor 1101 is configured to execute the application program code stored in the memory 1102.

The communications apparatus 1100 may be a terminal device, or may be a network device.

When the communications apparatus 1100 is a terminal device, the code stored in the memory 1102 is used to perform the following method:

generating, based on a first non-orthogonal access parameter, a signal that carries uplink data, where the signal that carries the uplink data occupies a first time-frequency resource; generating, based on a second non-orthogonal access parameter, a signal that carries uplink control information, where the signal that carries the uplink control information occupies a second time-frequency resource, the first time-frequency resource overlaps the second time-frequency resource, and the first non-orthogonal access parameter is different from the second non-orthogonal access parameter; and sending the signal that carries the uplink data and the signal that carries the uplink control information.

When the communications apparatus 1100 is a network device, the code stored in the memory 1102 is used to perform the following method:

sending first configuration information and second configuration information to a terminal device, where the first configuration information includes information about a first non-orthogonal access parameter used to transmit uplink data and information about a first time-frequency resource used to transmit the uplink data, and the second configuration information includes information about a second non-orthogonal access parameter used to transmit uplink control information on a second time-frequency resource, where the first non-orthogonal access parameter is different from the second orthogonal access parameter, and the first time-frequency resource overlaps the second time-frequency resource; and receiving an uplink signal sent by the terminal device, where uplink signals include a signal that is generated based on the first non-orthogonal access parameter and that carries the uplink data and a signal that is generated based on the first non-orthogonal access parameter and that carries the uplink control information, and the signal that carries the uplink control information occupies the second time-frequency resource.

An embodiment of the present invention further provides a computer storage medium. The computer storage medium may store a program, and the program performs some or all of the steps of the method in the embodiment shown in FIG. 2.

An embodiment of the present invention further provides another computer storage medium. The computer storage medium may store a program, and the program performs some or all of the steps of the method in the embodiment shown in FIG. 4.

It should be noted that, to make the descriptions brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the descriptions of each embodiment have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present invention essentially, or the part contributing to the prior art, or all or some of the technical solutions may be implemented in the form of a software product. The software product is stored in a memory and includes several instructions for instructing a computer device (which may be a personal computer, a server, a network device, or the like) to perform all or some of the steps of the methods described in the embodiments of the present invention. The foregoing memory includes: any medium that can store program code, such as a USB, a read-only memory (ROM), a random access memory (RAM), a removable hard disk, a magnetic disk, or an optical disc.

Persons of ordinary skill in the art may understand that all or some of the steps of the methods in the embodiments may be implemented by a program instructing relevant hardware. The program may be stored in a computer-readable memory. The memory may include a flash memory, a read-only memory (ROM), a random access memory (RAM), a magnetic disk, or an optical disc.

The embodiments of the present invention are described in detail above. The principle and implementation of the present invention are described herein through specific examples. The descriptions about the embodiments are merely provided to help understand the method and core ideas of the present invention. In addition, persons of ordinary skill in the art can make variations to the present invention in terms of the specific implementations and application scopes according to the ideas of the present invention. Therefore, the content of the specification shall not be understood as a limit to the present invention.

What is claimed is:

1. A method for transmitting an uplink signal, comprising:
generating, based on a first non-orthogonal access parameter, a signal that carries uplink data, wherein the signal that carries the uplink data occupies a first time-frequency resource;
generating, based on a second non-orthogonal access parameter, a signal that carries first uplink control information, wherein the signal that carries the first uplink control information occupies a second time-frequency resource, and the first time-frequency resource overlaps the second time-frequency resource; and
the first non-orthogonal access parameter is different from the second non-orthogonal access parameter; generating, based on a third non-orthogonal access parameter, a signal that carries second uplink control information, wherein the signal that carries the second uplink control information occupies a third time-frequency resource, and the first time-frequency resource overlaps the third time-frequency resource, and the first non-orthogonal access parameter is different from the third non-orthogonal access parameter;
the second time-frequency resource overlaps the third time-frequency resource and either only partially overlaps or does not overlap a fourth time-frequency resource carrying a third uplink control information, and the second non-orthogonal access parameter is different from the third non-orthogonal access parameter;
sending the signal that carries the uplink data and the signal that carries the first and second uplink control information; and
wherein at least one of the first non-orthogonal access parameter or the second non-orthogonal access parameter comprises different non-orthogonal access spreading factors and wherein the third uplink control information is one of a channel quality indicator, precoding matrix indicator and a ranking indicator.

2. The method according to claim 1, wherein the at least one of the first non-orthogonal access parameter or the second non-orthogonal access parameter comprise at least one of:
different bit-group-to-symbol-group mapping rules;
different interleaving parameters;
different scrambling parameters; or
different transmit powers.

3. The method according to claim 1, wherein the method further comprises:
determining the second non-orthogonal access parameter based on a type of the first uplink control information.

4. The method according to claim 1, wherein the method further comprises:
determining the second time-frequency resource based on a type of the first uplink control information.

5. The method according to claim 3, wherein the determining the second non-orthogonal access parameter based on a type of the uplink control information comprises:
determining, based on a type of the first uplink control information, the second non-orthogonal access parameter corresponding to the first uplink control information; and
determining, based on a type of the second uplink control information, the third non-orthogonal access parameter corresponding to the second uplink control information.

6. The method according to claim 4, wherein the determining the second time-frequency resource based on the type of the uplink control information comprises:
determining, based on the type of the first uplink control information, the second time-frequency resource occupied by a signal that carries the first uplink control information; and
determining, based on the type of the second uplink control information, the third time-frequency resource occupied by a signal that carries the second uplink control information.

7. The method according to claim 5, wherein in the generating of the signal that carries the first uplink control information and the second uplink control information are encoded as a whole.

8. A communications apparatus, comprising: a processor, configured to generate:
based on a first non-orthogonal access parameter, a signal that carries uplink data, wherein the signal that carries the uplink data occupies a first time-frequency resource; and
based on a second non-orthogonal access parameter, a signal that carries first uplink control information, wherein the signal that carries the first uplink control information occupies a second time-frequency resource, and the first time-frequency resource overlaps the second time-frequency resource; and the first non-orthogonal access parameter is different from the second non-orthogonal access parameter;

based on a third non-orthogonal access parameter, a signal that carries second uplink control information, wherein the signal that carries the second uplink control information occupies a third time-frequency resource, and the first time-frequency resource overlaps the third time-frequency resource, and the first non-orthogonal access parameter is different from the third non-orthogonal access parameter; and the second time-frequency resource overlaps the third time-frequency resource and either only partially overlaps or does not overlap a fourth time-frequency resource carrying a third uplink control information, and the second non-orthogonal access parameter is different from the third non-orthogonal access parameter; and a transmitter, configured to send the signal that carries the uplink data and the signal that carries the first and the second uplink control information;

wherein at least one of the first non-orthogonal access parameter or the second non-orthogonal access parameter comprises different non-orthogonal access spreading factors and wherein the third uplink control information is one of a channel quality indicator, precoding matrix indicator and a ranking indicator.

9. The communications apparatus according to claim 8, wherein the second non-orthogonal access parameter comprise at least one of:
different bit-group-to-symbol-group mapping rules;
different interleaving parameters;
different scrambling parameters; or
different transmit powers.

10. The communications apparatus according to claim 8, wherein the processor is further configured to determine the second non-orthogonal access parameter based on a type of the first uplink control information.

11. The method according to claim 8, wherein the processor is further configured to determine the second time-frequency resource based on the type of the uplink control information.

12. The communications apparatus according to claim 10, wherein: the first determining unit is configured to:
determine, based on a type of the first uplink control information, the second non-orthogonal access parameter corresponding to the first uplink control information; and
determine, based on a type of the second uplink control information, the third non-orthogonal access parameter corresponding to the second uplink control information; and
the second non-orthogonal access parameter comprises the first and third non-orthogonal access parameters.

13. The communications apparatus according to claim 12, wherein the processor is further configured to:
determine, based on the type of the first uplink control information, the second time-frequency resource occupied by a signal that carries the first uplink control information; and
determine, based on the type of the second uplink control information, a the third time-frequency resource occupied by a signal that carries the second uplink control information.

14. The communications apparatus according to claim 12, wherein in the process in which the processor generates the signal that carries the first uplink control information and the second uplink control information are encoded as a whole.

15. A communications apparatus, comprising:
a first transmitter, configured to send first configuration information, second configuration information and third configuration information to a terminal device, wherein the first configuration information comprises information about a first non-orthogonal access parameter used to transmit uplink data and information about a first time-frequency resource used to transmit the uplink data, the second configuration information comprises information about a second non-orthogonal access parameter used to transmit first uplink control information on a second time-frequency resource, wherein the first non-orthogonal access parameter is different from the second non-orthogonal access parameter, and the first time-frequency resource overlaps the second time-frequency resource, and the third configuration information comprises information about a third non-orthogonal access parameter used to transmit second uplink control information on a third time-frequency resource, wherein the first non-orthogonal access parameter is different from the third non-orthogonal access parameter, and the first time-frequency resource overlaps the third time-frequency resource, the second time-frequency resource overlaps the third time-frequency resource and either only partially overlaps or does not overlap a fourth time-frequency resource carrying a third uplink control information, and the second non-orthogonal access parameter is different from the third non-orthogonal access parameter; and a receiver, configured to receive uplink signals sent by the terminal device, wherein the uplink signals comprise a signal that is generated based on the first non-orthogonal access parameter and that carries the uplink data, a signal that is generated based on the second non-orthogonal access parameter and that carries the first uplink control information and a signal that is generated based on the third non-orthogonal access parameter and that carries the second uplink control information, the signal that carries the uplink data occupies the first time-frequency resource, and the signal that carries the first uplink control information occupies the second time-frequency resource, and the signal that carries the second uplink control information occupies the third time-frequency resource;

wherein at least one of the first non-orthogonal access parameter or the second non-orthogonal access parameter comprises different non-orthogonal access spreading factors and wherein the third uplink control information is one of a channel quality indicator, precoding matrix indicator and a ranking indicator.

16. The communications apparatus according to claim 15, wherein the at least one of the first non-orthogonal access parameter or the second non-orthogonal access parameter comprise at least one of: different bit-group-to-symbol-group mapping rules; different interleaving parameters; different scrambling parameters; or different transmit powers.

17. The communications apparatus according to claim 15, wherein the second configuration information further comprises information about the second time-frequency resource.

18. The communications apparatus according to claim 17, wherein the second time-frequency resource is determined based on a type of the uplink control information.

19. The communications apparatus according to claim 15, wherein the second non-orthogonal access parameter is determined based on a type of the uplink control information.

20. The communications apparatus according to claim 19, wherein: the information about the second non-orthogonal access parameter used to transmit the uplink control information comprises information about the second non-orthogonal access parameter used to transmit the first uplink control information and information about a third non-orthogonal access parameter used to transmit the second uplink control information; and the second time-frequency resource includes the first and third time-frequency resources.

21. The method according to claim 1, wherein the first and second time-frequency resources only partially overlap.

22. The method according to claim 1, wherein the first non-orthogonal access parameter and the second non-orthogonal access parameter comprise at least one of: different non-orthogonal access spreading factors; different bit-group-to-symbol-group mapping rules; different interleaving parameters; or different scrambling parameters.

23. The method according to claim 6,
wherein: the third uplink control information is different from information included in the first uplink control information and information included in the second uplink control information;
the method further comprising determining, based on a type of the third uplink control information, a third additional second non-orthogonal access parameter corresponding to the third uplink control information, and determining, based on the type of the third uplink control information, third additional second time-frequency resource occupied by a signal that carries the third uplink control information.

24. The method according to claim 23, wherein the first, second and third second time-frequency resources at least partially overlap with each other.

25. The method according to claim 23, wherein the first and third time-frequency resources at least partially overlap with each other, and the second and third time-frequency resources do not overlap with each other.

26. The method according to claim 23, further comprising fourth, fifth and sixth uplink control information;
wherein the first uplink control information includes the CQI/PMI, the second uplink control information includes a HARQ-ACK, the third uplink control information includes the RI, the fourth uplink control information includes the CQI/PMI, the fifth uplink control information includes the RI, and the sixth uplink control information includes the HARQ-ACK;
the method further comprising determining, based on the type of the fourth uplink control information, a fourth non-orthogonal access parameter corresponding to the fourth uplink control information, determining, based on the type of the fifth uplink control information, a fifth time-frequency resource occupied by a signal that carries the fifth uplink control information, and determining, based on the type of the sixth uplink control information, a sixth non-orthogonal access parameter corresponding to the sixth uplink control information.

* * * * *